Figure 1:
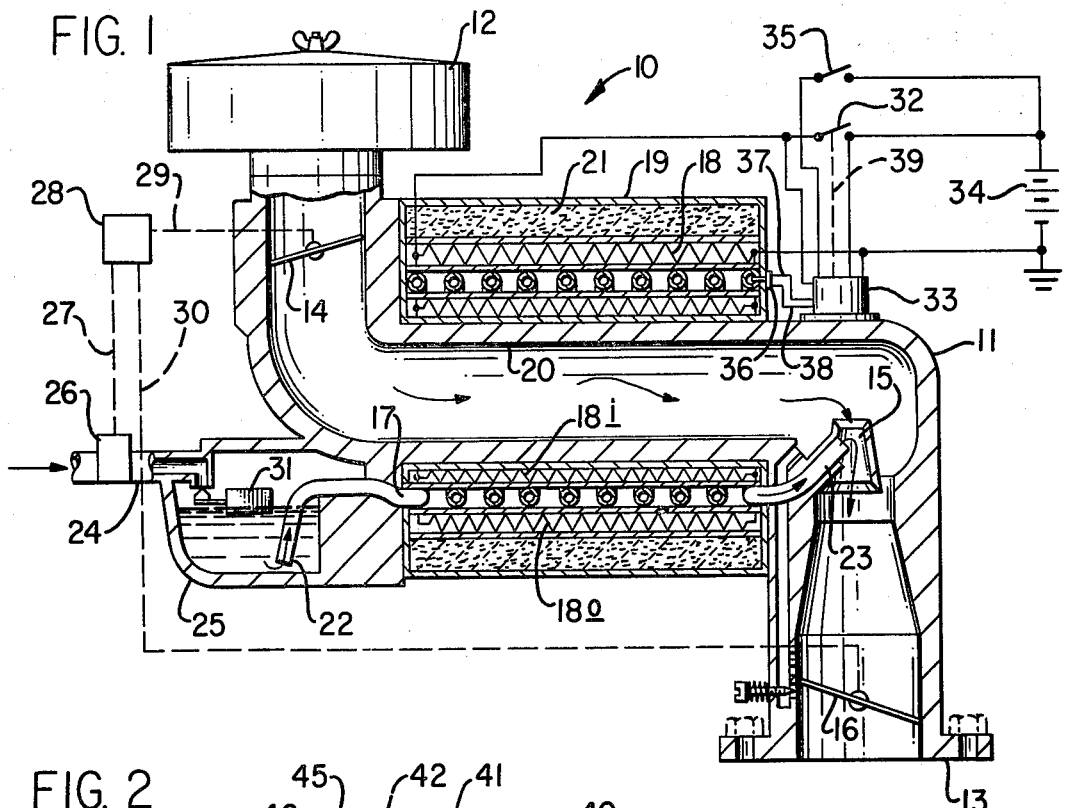

United States Patent [19]

Day

[11] 4,213,433
[45] Jul. 22, 1980

[54] LIQUID FUEL TO GAS CONVERTER FOR ENGINES

[76] Inventor: John C. Day, 2316 Stafford La., Mesquite, Tex. 75150

[21] Appl. No.: 846,774

[22] Filed: Oct. 31, 1977

[51] Int. Cl.² .............................................. F02M 31/00
[52] U.S. Cl. .................................... 123/549; 123/555; 261/144; 261/145; 261/142
[58] Field of Search ................ 123/122 E, 133, 122 F, 123/122 D, 122 H, 122 C; 261/144, 145, 142

[56] References Cited

U.S. PATENT DOCUMENTS

| | | | |
|---|---|---|---|
| 1,107,967 | 8/1914 | Knaak | 123/122 C |
| 1,311,532 | 7/1919 | Schmid | 123/122 F |
| 1,319,718 | 10/1919 | Martin | 123/122 F |
| 1,325,998 | 12/1919 | Schmid et al. | 123/122 F |
| 1,326,000 | 12/1919 | Schmid | 123/122 F |
| 2,821,843 | 2/1958 | Mengelkamp | 123/122 E |
| 3,762,378 | 10/1973 | Bitonti | 123/122 E |
| 3,986,486 | 10/1976 | Rabbiosi | 123/122 E |

Primary Examiner—Ronald H. Lazarus
Attorney, Agent, or Firm—Warren H. Kintzinger

[57] ABSTRACT

A liquid fuel to gas converter and feed structure for internal combustion engines. Liquid fuel is transformed to the molecular gaseous state after being meter fed while it is passed through an elongate heated tubular element from which it is mixed with air being fed to the internal combustion engine.

12 Claims, 6 Drawing Figures

LIQUID FUEL TO GAS CONVERTER FOR ENGINES

This invention relates in general to liquid fuel gassification for improved fuel economy and internal combustion engine performance and, in particular, to an engine fuel gassifier having an elongate heated tubular element into which liquid fuel is metered and from which fuel in the gassified form is passed and mixed with intake air to an engine.

Fuel economy is important with vehicles today, particularly, with present energy problems including fuel shortages and constantly increasing fuel costs. Environmental pollution problems have resulted in legislative action requiring more efficient engines with less pollution to meet tighter emission standards. Exhaust gas recirculation, catalytic converters and/or auxiliary air pumps and other controls are being designed into vehicles greatly increasing vehicle costs so, obviously, if engine fuel economy efficiency is increased such that pollution control equipment is not needed, further engine efficiency increase is attained.

Most present day internal combustion engines use liquid gasolines as fuel that is a product of expensive petroleum cracking and reforming processes of an involved nature. Such extensive reforming processes, and inclusion of fuel additives is important in attaining higher fuel octane ratings required with many present engines since octane rating, for example, is a factor in determining compression ratio in engine design. The improved fuel system transforms liquid fuel to the molecular gaseous state and in doing so, enables use of a considerable range of hydrocarbon distillates, generally in a range from 50° C. to 300° C., including those known commercially as gasoline and kerosene. With fuel being converted to the gaseous molecular state prior to usage, octane ratings as such become irrelevant with light and heavy hydrocarbons such as methane, ethane, fuel oils and others interchangeably useable.

Preexisting internal combustion engines rely generally on liquid or vapor gasoline as fuel with carburetion and fuel injection the most common ways of feeding fuel to the engine in the liquid or vapor mist state. Gasoline in these states reacts quite differently from gaseous state fuel particularly with respect to changes in temperature and pressure. Gaseous state fuels follow the kinetic molecular theory of matter with gaseous state products providing greater freedom of movement of molecules than when in the liquid or vapor mist states, with movement of the gaseous state molecules limited only by the walls of the containing vessel. Molecules in a liquid or vapor mist state are clustered close together thus having a relatively small amount of kinetic energy when compared to the gaseous molecular state molecules having almost unlimited freedom of movement. Gaseous state molecules are in constant motion colliding frequently with each other and the walls of the chamber. Under normally encountered environmental conditions, the distance between molecules are large compared to the size of the molecules themselves, with molecules of a gaseous state substance moving in all directions with an average velocity at a given temperature. Further, molecules of a gaseous state substance are perfectly elastic with no energy being lost as a result of collision of molecules. The temperature of material in the molecular-gaseous state is directly proportional to the average kinetic energy of the molecule with kinetic energy increasing as the temperature increases. Volume of a given mass of gaseous state fuel is dependent upon the temperature and pressure it is under at any particular time with three variables in the state equation temperature, pressure and volume.

When liquid or vapor mist react, no common generalization can be made concerning the volumes of reactants and products such as applicable to fuel in the gaseous molecular state and gaseous state air required for combustion. However, when substances in the gaseous state are involved in chemical change, a definite volume relationship exists among the gaseous reactants and products. The relationship allows for optimized fuel-air mixture by simple volumetric relationships and supports desired combustion characteristics. With engines employing carburetors of a preexisting conventional nature, intake air breaks fuel into fine droplets and there is some gassification. However, since droplet size varies with intake air speed and intake air speed varies over a wide range, droplet size varies from smaller droplets at higher intake air speeds to larger droplets at lower intake air speeds.

With the improved fuel feed system after fuel gasification the molecular gaseous state fuel is mixed with air in controlled volumetric range portions for desired engine performance and efficiency of operation. More correctly exact fuel to air mixtures for combustion can be maintained through out the varied range of engine power requirements with the mixing accomplished either through an intake manifold or in a chamber near the cylinder. Although it is well known that proper fuel to air mixture provides increased power, preexisting systems have not found a solution utilizing liquid or vapor fuel and air consistently providing reasonably optimized proper mixture. Generally, present combination techniques have been depending on combustion of liquid or vapor misted fuels in air with such fuels in a state tending to cluster fuel molecules close together lowering their kinetic energy and decreasing desired combustion characteristics. Fuels in the liquid and misted form also have a high density per unit area, requiring additional fuel to fill the same volume. When both the fuel and air mixture are in a gaseous state, it provides a uniform mixture, separation of molecules, a high kinetic energy, total elasticity (no loss in energy due to collision), and uniform combustion. Additives are added to present day fuels as antioxidant inhibitors, metal deactivators and surface ignition inhibitors. Basically these additives are required to improve the octane rating and to inhibit adverse chemical recombination of the fuel in the combustion mixture. These additives reduce the combustion capability of the fuel to air mixture causing hazardous by-products and have adverse by-product reactions upon combustion leaving deposits in the cylinder and creating adverse exhaust fumes. Contrarily, the gaseous state combustion process does not utilize any of these additives in its fuel to air mixture allowing a complete, fume free combustion process. In the gaseous state, chemical change effects are minimized such as absorption of oxygen by hydrocarbons, reaction with metal, and surface ignition due to the large separation of the molecules, perfect elasticity, and chemical stability. The molecular injection combustion process is a high purity gaseous hydrocarbon and air technique which expands only on ignition (providing faster ignition) leaving no adverse exhaust by-products and increasing the power and life of the engine.

It is therefore a principal object of this invention to provide fluid fuel gassification to the molecular gassified state for internal combustion engines.

Another object is to increase internal combustion engine efficiency that fuel consumption is greatly reduced.

A further object with such fuel systems is to reduce engine emission pollution through improved engine performance and efficiency.

Still another object is to eliminate any requirement for emission pollution control devices through greatly increased internal combustion engine efficiency.

Features of this invention useful in accomplishing the above objects include an engine liquid fuel gassifier having an elongate heated tubular element into which liquid fuel is metered and from which fuel in the molecular gassified state is passed and mixed with intake air to an engine. Fuel metering means and air flow means are provided along with heating and automatic heating control structure to ensure substantially complete transformation of fuel from the liquid state to the fully molecular gassified state.

Specific embodiments representing what are presently regarded as the best modes of carrying out the invention are illustrated in the accompanying drawings.

Figure 2:
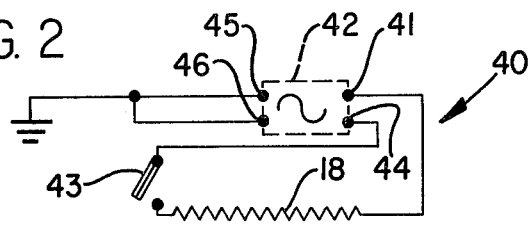
Figure 3:
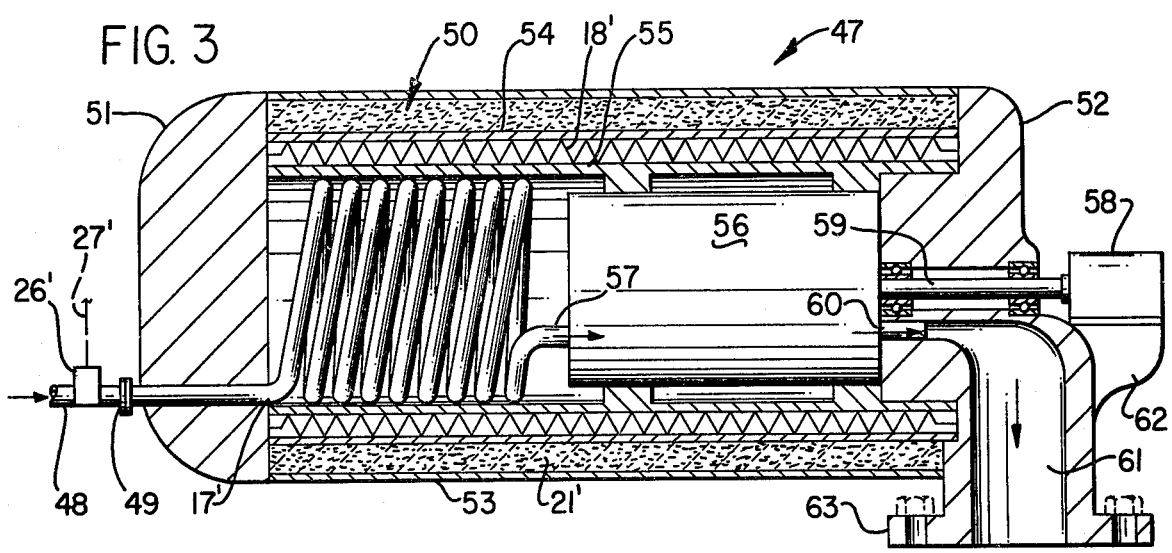
Figure 4:
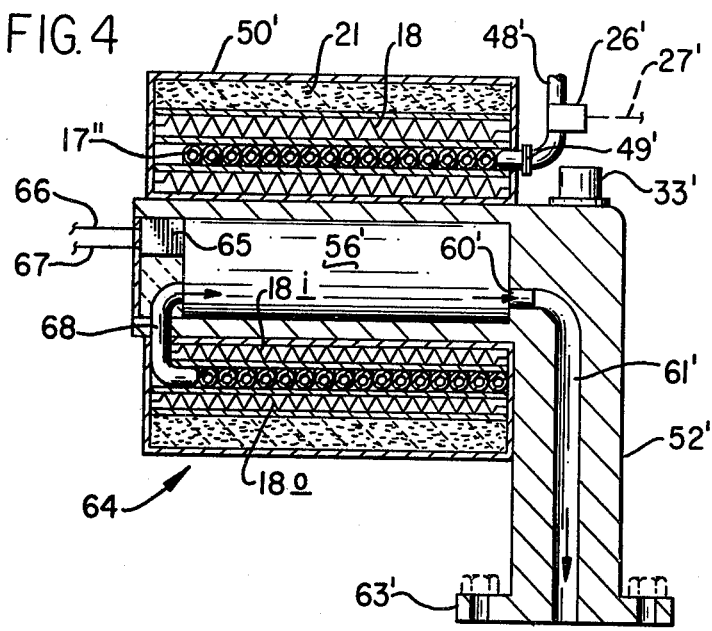
Figure 5:
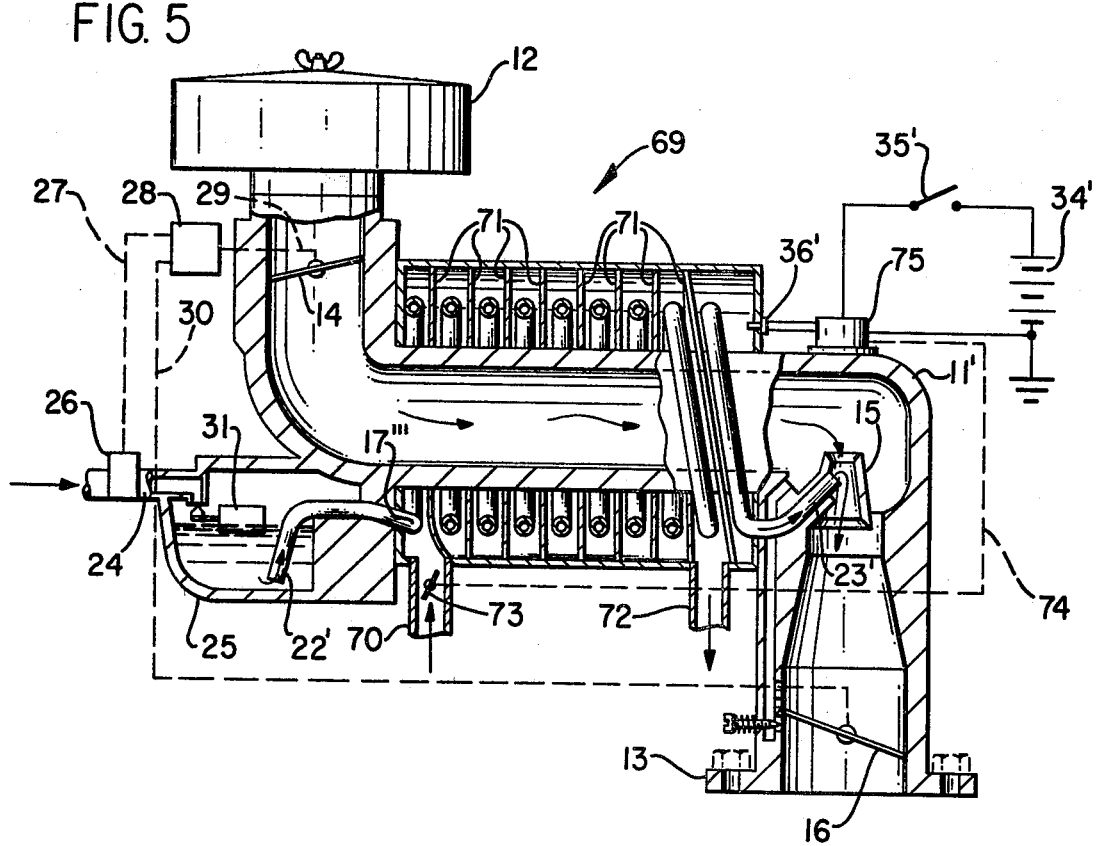
Figure 6:
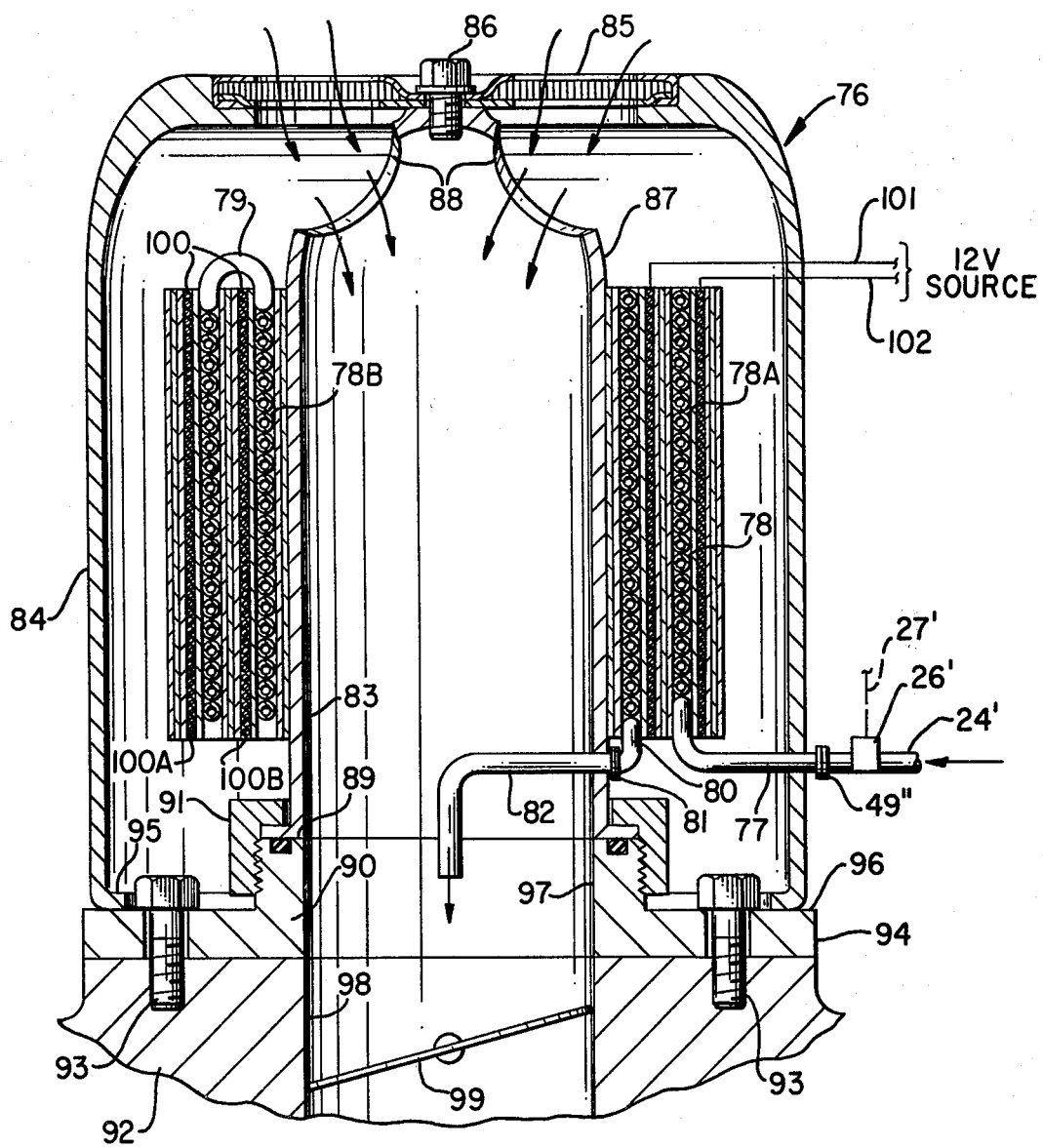

In the drawings:

FIG. 1 represents a partially broken away and sectioned view of a liquid fuel to gas converter, for an internal combustion engine, using an elongate heated tubular element within which liquid fuel is transformed to the molecular gaseous state and from which gaseous fuel is mixed with air being fed to the engine;

FIG. 2, an alternate electric heating element control system to the heating element control system in the liquid fuel to gas converter of FIG. 1;

FIG. 3, a liquid fuel to gas converter including a compressor bringing molecular gaseous state fuel to pressure levels required for controlled feeding of gaseous fuel to turbine or ram jet engines;

FIG. 4, an alternate liquid fuel to gas converter embodiment for turbine and ram jet engines;

FIG. 5, a liquid fuel to gas converter much like the embodiment of FIG. 1, using exhaust gas for heat input to the elongate heated tubular element in place of an electric heating element system; and, FIG. 6, a broken away and sectioned view of another liquid fuel to gas converter embodiment for engines.

Referring to the drawings:

The liquid fuel to gas converter system 10 of FIG. 1, for an internal combustion engine (not shown) is shown to have a through air passage structure 11 extending from air filter 12 to engine intake manifold mounting end 13 equipped with intake end butterfly valve 14, a gaseous fuel and intake air mixing throat structure 15, and an outlet end butterfly valve 16. The through air passage structure 11 is shown to mount a coiled tube 17 and heating element 18 containing housing assembly 19 that surrounds (in annular relationship) a mid body portion 20 of the through air passage structure 11. The housing assembly 19 also encloses an outer annular insulation material band section 21 within which the heating element 18 is shaped and positioned such as to be both radially inside and outside the coiled tube 17 as annular heating bands 18*i* and 18*o* for imparting controlled heat input to the coiled tube 17 such as to ensure substantially complete transformation of liquid fuel metered into the tube 17 at input end 22 to substantially completely gassified fuel at the outlet end 23. The fuel line 24, feeding liquid fuel to feed control reservoir 25, is equipped with a fuel metering needle valve 26, that is subject to control by a mechanical drive linkage connection 27 with a drive throttle control 28 (of conventional type construction detail not shown). Drive linkage connections 29 and 30 also extend from drive throttle control to butterfly valves 14 and 16, respectively, in the inlet through air passage structure 11.

Metered liquid fuel is further flow controlled by float valve structure 31 in the reservoir 25 and flows from the reservoir 25 into the input end 22 of the coiled tube 17. Tube 17 is of such material, so sized and of such longitudinal length through the coil convoluted body thereof that, with thermostatically regulated heat input from the heating element 18, it is such as to ensure therein substantially complete transformation of liquid fuel to a molecular gaseous state as the fuel is moving therethrough before it reaches outlet end 23. An end of electric heating element 18 is connected to ground and the other end of element 18 is connected to, and through, both switch 32 and temperature control 33 (of conventional construction detail not shown) in parallel to the positive side of battery 34 that has a negative side connection to ground. A manually operated start switch 35 is closed to supply power to temperature control 33 and thereby activate the control 33 to close switch 32 and supply power to electrical heating element 18. Thermocouple element 36, mounted to sense temperature of the coiled tube 17, in this instance near the output end of tube 17, is connected by wires 37 and 38 to temperature control 33 in order that the control may be caused to open switch 32 via mechanical linkage 39 from temperature control 33 whenever temperature sensed by thermocouple element 36 exceeds a predetermined desired set level. When this occurs, reduced electric power flow is provided through the temperature control 33 to the electric heating element 18.

In the alternate electric heating element control system 40 of FIG. 2, the electric heating element 18 has an end connection to an output terminal 41 of electrical power generator 42 (or alternator). The other end of element 18 is connected through bimetallic switch 43 to output terminal 44 of generator 42 that has two other terminals 45 and 46 connected in common to ground. The bimetallic switch 43 is positioned in a gas converter system much like positioning of thermocouple element 36 in FIG. 1 to sense and react to temperature of the coiled tube 17 so as to ensure substantially complete transformation of liquid fuel metered to the tube 17.

The alternate embodiment of FIG. 3 presents a liquid fuel to gas converter 47 for internal combustion engines that includes turbine and ram jet engines. Liquid fuel is fed through fuel line 48 and through fuel metering needle valve 26' that is subject to control by a mechanical drive linkage connection 27' with a drive throttle control (not shown) much like control 28 of FIG. 1. Fuel line 48 is connected by coupling 49 to the input end of the coiled tube 17' that is substantially entirely contained within fuel gasification chamber or housing assembly 50. Housing assembly 50 includes an inlet end member 51 and an outlet end member 52 that are interconnected by a cylindrical outer housing shell 53 enclosing an annular insulation material band 21', an insulation band support cylindrical member 54, within the insulation material band 21', and an annular heat element 18' structure that is enclosed within cylindrical member 54 and around generally cylindrical support member 55. Cylindrical support member 55 interconnects housing inlet and outlet end members 51 and 52 enclosing and mounting in longitudinal orientation first coiled tube 17' and then a compressor 56 receiving molecular gaseous state fuel from the output end 57 of coiled tube 17'. Here again, coiled tube 17' is of such material, so sized, and of such longitudinal length through the coil convoluted body thereof, that with thermostatically regulated heat input from the heating element 18', is such as to ensure therein substantially complete transformation of liquid fuel to a molecular gaseous state as the fuel is moving therethrough before it reaches outlet end 57. The compressor 56, driven by motor 58 through drive shaft 59, compresses molecular gaseous state fuel and supplies the compressed fuel from outlet 60 through passage 61 in outlet end member 52 that is formed with a boss 62 to mount motor 58 and a connection mount flange 63 for connection to a turbine or ram jet engine (not shown) at an appropriate pressurized fuel inlet location in the engine.

In the embodiment of FIG. 4, another liquid fuel to gas converter 64 for turbine and ram jet internal combustion engines is presented that is a concentric forshortened design from the embodiment of FIG. 3. Liquid fuel is fed through fuel line 48' and through fuel metering needle valve 26' that, like with the FIG. 3 embodiment, is subject to control by a mechanical drive linkage connection 27' with a drive throttle control (not shown) much like control 28 of FIG. 1. Fuel line 48' is connected by coupling 49' to the input end of the coiled tube 17" that is substantially entirely contained within housing assembly 50'. The inlet end of housing assembly 50' is also the outlet end with the coiled tube 17" and the compressor assembly 56' in concentric relation to each other. The compressor assembly 56' that includes a driving motor (not shown) is supplied power from power and control box 65 that receives electric power through lines 66 and 67, and receives gasified fuel from the output end 68 of coiled tube 17". The compressor assembly 56' compresses molecular gaseous state fuel and supplies the compressed fuel from outlet 60' through passage 61' in outlet end member 52' that is formed with a connection mount flange 63' for connection to a turbine or ram jet engine (not shown) at an appropriate pressurized fuel inlet location in the engine. Please note that the housing assembly 50', just like with housing assembly 19 of FIG. 1, encloses an outer annular insulation band section 21 within which the heating element 18 is shaped and positioned such as to be both radially inside and outside the coiled tube 17" as annular heating bands 18i and 18o for imparting controlled heat input to the coiled tube 17". This is to ensure substantially complete transformation of liquid fuel metered into the tube 17" at the input end through coupling 49' to substantially completely gasified fuel at the outlet end 68 from which it passes into compressor assembly 56'. The power control for element 18 is supplied via temperature control 33' and such power control circuitry and elements that are shown with temperature control 33 of FIG. 1.

The liquid fuel to gas converter system 69 of FIG. 5 is another embodiment very much like the embodiment of FIG. 1 with exhaust gas from the exhaust system of an engine supplying the heat required in place of the heating element 18 of FIG. 1. The control system for heat input to the coiled tube 17''' is also different from the temperature control 33 and associated heat control circuitry of FIG. 1. Exhaust line pipe 70 is connected to and conveys hot exhaust gases from exhaust manifolding of an engine (not shown) to a spiral passageway formed with spiralled baffle walling 71 that follows the coils of coiled tubing 17'''. The exhaust gases exit through outlet pipe 72 after having passed through the spiral passageway imparting heat to the coiled tube 17''' in the process. The exhaust line pipe 70 is equipped with a butterfly valve 73 that is control drive positioned via mechanical drive linkage 74 from temperature control 75 as governed by temperature sensed by thermocouple element 36'. Temperature control 75 is activated with power from battery 34' when switch 35' is closed for heat control for tubing 17'''. Thermocouple element 36' may be repositioned for optimized heat control of the system. The heat input and control systems are such as to ensure substantially complete transformation of liquid fuel to substantially completely gasified molecular gaseous state fuel as the fuel is passed through coiled tube 17'''. Parts having the same identification numbers with this embodiment as in the FIG. 1 embodiment are the same and function substantially the same in the embodiment of FIG. 5.

The liquid fuel to gas converter system 76 of FIG. 6 is a vertically oriented embodiment with a fuel line 24' feeding liquid fuel through a fuel metering needle valve 26' that is subject to control by a mechanical drive linkage connection 27' with a drive throttle control (not shown). The liquid fuel is passed through coupling 49" to the input end 77 of tubular coil 78, that is in the form of a two banked tubular coil 78 with outer coil 78A connected to inner coil 78B by an interconnect loop 79, to gasified fuel outlet end 80 connected through coupling 81 to gasified fuel outlet pipe 82 that extends through air passage wall 83. The system 76 includes an outer vertical cylindrical casing 84 with a filter structure 85 fastened as a casing 84 assembly with a bolt 86 at the top to an inner cylindrical air passage member 87 including cylindrical wall 83 and air passage opening 88 at the top. The inner cylindrical air passage member 87 is seated on the inner top 89 of mount member 90 by large nut clamp down member 91. Member 90 is, in turn, mounted on the top of engine intake air and gas passage manifold member 92 by bolts 93 through flange 94 of mount member 90. The bottom formed inward flange 95 of cylindrical casing 84 seats on the top 96 of flange 94 of mount member 90 that is formed with an inner air and gas passage 97 in line with intake air and gas passage 98 in manifold member 92 that contains butterfly valve 99 that may be connected for throttle control (detail not shown). The coiled tube structure 78 is heated by a double concentrically banked heating element structure 100 with bank 100A outside of tube coil section 78A and bank 100B between the tube coil sections 78A and 78B with the heating structure 100 supplied electric power through lines 101 and 102 in a power supply system (not completely detailed). The coiled tube structure 78 with the heating element structure 100 is mounted in position on the outside of air passage member 87 by conventional means not shown in detail.

The coiled tubes in the different embodiments that are the elongate heated tubular element into which liquid fuel is metered and from which fuel in the molecular gasified state is passed have been, in test units, copper tubing. In one instance, the tubing was quarter inch copper tubing over 25 feet long formed into a coil. Obviously, other high heat conductive materials such as aluminum may be used in tubing for the coils in units in attaining substantially the same operational results. Further, it should be noted that various other tubing diameters and lengths may be employed in balanced relation to the fuel demands of internal combustion engines they are used with and to the rate of controlled heat input to the coiled tubing such as to ensure substantially complete transformation of liquid fuel to the molecular gaseous state as the fuel is passed through the coiled tube.

Whereas this invention is herein illustrated and described with respect to several embodiments thereof, it should be realized that various changes may be made without departing from essential contributions to the art made by the teachings hereof.

I claim:

1. In a liquid fuel to gas converter for internal combustion engines: housing means; elongate fuel conveying means made of high heat conductive material mounted within said housing means; said elongate fuel conveying means having a fuel inlet end constructed for liquid fuel input from liquid supply means, and an outlet end positioned for delivery of molecular gaseous state fuel to engine fuel intake means; a heating system with heating element means mounted within said housing means to heat said elongate fuel conveying means sufficiently to ensure substantially complete transformation of fuel from the liquid state to the molecular gasified state as fuel is passed through said elongate fuel conveying means after initial warmup; wherein said elongate fuel conveying means is tubular element means formed primarily as coil means contained in foreshortened form within said housing in an efficiently packaged structure; with said heating system means in close contiguous relation to said coil means for optmized heat transfer to and through said coil means to the fuel being passed through the tubular element means formed into said coil means; wherein said heating system means is in concentric relation with said coil means; said heating system means includes an electric resistance element means formed into a cylindrical structure in close contiguous relation to said coil means; and wherein an air intake passage structure is provided with an air passage for feeding intake air to an internal combustion engine; and wherein a portion of said air passage is through, and surrounded by said heating system means and said coil means for heat transfer to intake air prior to admission of fuel in the heated molecular gasified state.

2. The liquid fuel to gas converter of claim 1, wherein said heating system means includes, temperature sensing means; temperature power media feed means; and control means responsive to inputs from said temperature sensing means for varying control of said control means in controlling said temperature power media feed means.

3. The liquid fuel to gas converter of claim 2, wherein said temperature sensing means is a thermocouple positioned to sense temperature of said coil means at a desired location.

4. The liquid fuel to gas converter of claim 1, wherein said coil means is formed as a single coil structure with inlet and outlet connective means for said tubular element means.

5. The liquid fuel to gas converter of claim 4, wherein said heating system means includes two electric resistive element means cylindrical structures, one radially within said single coil structure and one radially outside of said single coil structure.

6. The liquid fuel to gas converter of claim 1, wherein said coil means is formed as a plurality of coil structures in concentric relation.

7. The liquid fuel to gas converter of claim 6, wherein said electric resistance element means is formed into a plurality of cylindrical structure sections with at least one of said cylindrical structure sections positioned between a set of two of said plurality of coil structures.

8. The liquid fuel to gas converted of claim 1, with said housing means also enclosing annular band insulation material means.

9. The liquid fuel to gas converter of claim 1, wherein said converter is constructed with an air intake passage member having an air intake passage in line with an engine intake manifolding intake passageway when mounted in place on the engine intake manifold.

10. The liquid fuel to gas converter of claim 9, wherein said converter is a vertically oriented unit with an air intake filter insert at the top of the converter housing means.

11. The liquid fuel to gas converter of claim 1, wherein the tubing forming said coil means is tubing in the range from approximately one sixteenth to one half inch diameter tubing; and with the tubing length through the convoluted longitudinal coiled length thereof falling in the range of approximately two feet to thirty-five feet.

12. The liquid fuel to gas converter of claim 1, wherein said tubular element means is from a class of high heat conductive materials including copper and aluminum.

* * * * *